United States Patent [19]

Hsieh

[11] 4,160,663
[45] Jul. 10, 1979

[54] METHOD FOR THE DIRECT REDUCTION OF IRON ORE

[76] Inventor: Jack Hsieh, Rte. 2, Box 15-c, Richland, Wash. 99352

[21] Appl. No.: 879,250

[22] Filed: Feb. 21, 1978

[51] Int. Cl.$^2$ .............................................. C21B 13/02
[52] U.S. Cl. .......................................... 75/35; 75/26; 75/91
[58] Field of Search ............................... 75/26, 33–38, 75/91

[56] References Cited

U.S. PATENT DOCUMENTS

| 2,786,747 | 3/1957 | Gallusser | 75/33 |
| 3,427,013 | 2/1969 | Cavanagh | 75/34 |
| 3,853,538 | 12/1974 | Nemeth | 75/35 |
| 3,928,021 | 12/1975 | Matsubara | 75/35 |
| 3,977,844 | 8/1976 | Van Slyke | 48/202 |

FOREIGN PATENT DOCUMENTS

| 1396205 | 6/1975 | United Kingdom | 75/5 |
| 1403187 | 8/1975 | United Kingdom | 75/24 |

OTHER PUBLICATIONS

Miller, Jr. *Scientific American* Jul. 1976, pp. 68–71, 74–80.

*Primary Examiner*—M. J. Andrews
*Attorney, Agent, or Firm*—Robert Keith Sharp

[57] ABSTRACT

A method and apparatus for the direct reduction of iron ore are disclosed. A mixture of iron ore, solid carbonaceous fuel and, if sulfur is present, calcined limestone or dolomite, are used. The carbonaceous material can be cellulosic material (wood waste, paper, particularly municipal trash, garbage, etc.), charcoal, or coal (preferably sub-bituminous coal or lignite). The above feed is continuously charged into a gasification and initial reduction zone of a shaft furnace which is partitioned partially from the remainder of the furnace. Oxygen and hot steam are introduced into the upper portion of the said zone. Partial combustion or pyrolysis of the fuel and reaction with steam take place, producing reducing gas which initiates reduction of the iron ore. Ore and gas flow downwardly through conduits into the final reduction zone. Meanwhile, hydrogen-enriched reducing gas is introduced in the middle of the final reduction zone. Top gas is withdrawn from the upper open space of the final reduction zone, drawing reducing gas downwardly from the gasification and initial reduction zone and upwardly through the final reduction zone. In addition, top gas is withdrawn from the bottom of the final reduction zone. Reduction of the iron ore to sponge iron is completed in the final reduction zone. A portion of the withdrawn top gas is cooled, purified of dust, carbon dioxide and sulfur and dehumidified, then introduced near the bottom of the shaft furnace. It ascends, cooling and carburizing the sponge iron descending from the final reduction zone and becoming heated. The cooling gas is then withdrawn from the bottom of the final reduction zone. A special form of discharge grate discharges iron successively from different areas, so as to produce agitation and mixing.

10 Claims, 5 Drawing Figures

METHOD FOR THE DIRECT REDUCTION OF IRON ORE

INTRODUCTION

This invention is directed to the so-called solid fuel "direct reduction" of iron ore, i.e., the reduction of the ore at temperatures below the melting point of iron, producing what is called "sponge iron". This product, as its name implies, has a somewhat porous structure and contains small amounts of unreacted iron oxide, iron carbide and free carbon. When it is melted in a steel furnace the carbon completes the reduction of the iron oxide.

BACKGROUND

Direct reduction processes have come into increasing prominence in recent years for several reasons. They can be economically built to smaller capacities than blast furnaces. They are better adapted to intermittent operation than blast furnaces. They are more versatile in fuels than blast furnaces, not requiring the high priced coke which is necessary for the latter. Suitable coking coals are not widely distributed and are becoming increasingly difficult and expensive to obtain.

The direct reduction process is primarily a reduction by gases, usually hydrogen and carbon monoxide. In the most widely used processes, according to the literature, a mixture of these gases is produced by "reforming" natural gas by reaction with steam and oxygen. In some cases other hydrocarbon gases or light petroleum fractions have been used.

As is well known, however, natural gas is becoming increasingly expensive and future supplies are in doubt. There is, therefore, an incentive to use other fuels.

One commercial or developmental process utilizes coal as the source of reducing gases. A mixture of coal and iron ore is introduced into the upper end of a huge inclined rotary kiln. Air is introduced at various points along the kiln, producing partial combustion of the coal, elevating the temperature and producing carbon monoxide, which acts as the reductant.

In another proposed process, coal is to be gasified by reaction with oxygen and steam, producing a mixture of carbon monoxide and hydrogen, which is to be used as the reducing gas. In that process the gasification of the coal takes place in either a dilute phase or fluidized bed gasifier and the gas is utilized in a separate reduction furnace.

An extremely large number of United States patents have been granted on direct reduction processes. Therefore, only those which appear most pertinent to this invention will be discussed.

Cavanaugh U.S. Pat. No. 3,427,013 is directed to a "low temperature blast furnace". A mixture of ore with coal, coke, or lignite is introduced into the top of a shaft furnace. Heated air, in a quantity sufficient to cause only partial combustion of the fuel, is introduced at several points in the upper portion of the furnace, producing carbon monoxide, which is considerably diluted by the nitrogen of the air. The ore is successively heated by the combustion of the fuel and reduced by the carbon monoxide. In the lowermost section of the shaft the "metallized ore" is cooled by indirect heat exchange with the incoming air. The furnace operates under super atmospheric pressure, with waste gases being withdrawn primarily from the top of the furnace. Some, however, flows downwardly and out the bottom, serving as an air seal.

This patent does not disclose operation under conditions such as to produce hydrogen, which is recognized as a more effective reducing agent than carbon monoxide, and discloses no recycle of the off-gases, which contain a large proportion of nitrogen.

Nemeth U.S. Pat. No. 3,853,583 discloses a process in which coal or lignite (the emphasis being on the latter) is gasified in a separate gasifier by partial combustion with oxygen, "little or no steam" and very little nitrogen. The gas, said to be primarily carbon monoxide and hydrogen, is desulfurized and introduced into the lower portion, but above the bottom, of a shaft furnace. The off gas is scrubbed and the carbon dioxide is removed. A portion of the cooled and purified gas is introduced into the bottom of the shaft furnace to cool the sponge iron. Another portion is mixed with the reducing gas either in the gasifier or between the gasifier and the desulfurizer.

The use of a separate gasifier complicates the apparatus and increases heat loss.

Galluser U.S. Pat. No. 2,786,747 discloses a process in which ore mixed with coal or coke is introduced into the top of a shaft furnace, while steam is introduced near the midpoint. The central portion of the furnace is heated electrically to a temperature such that the steam reacts with the coal or coke to produce carbon monoxide and hydrogen and to cause reduction of the iron ore. A temperature of 950° C. is employed, which is below the melting point of carburized iron. A mixture of hydrogen, water, carbon monoxide and carbon dioxide is withdrawn from the top of the furnace. In the upper portion of the furnace they serve to preheat the iron ore and are partially cooled. They are then further cooled, the carbon dioxide is removed and the other gases are recycled to the bottom. Rising through the descending iron ore, they cool it and become heated. They then take part in the reduction of the iron ore.

This process relies on the use of electrical heating, which is expensive.

None of these patents, and no literature of which I am aware, discloses the use of cellulosic material, such as wood waste, municipal trash, or garbage as the fuel in a modern direct reduction process. Charcoal, derived from wood, was, of course, used for centuries in the reduction of iron ore before the introduction of coke.

SUMMARY OF THE INVENTION

The object of this invention is to provide a direct reduction process utilizing solid fuel which is versatile as to the fuel used and economical as to capital investment. The process is carried out in a fixed shaft furnace in which gasification of the fuel and reduction of the ore take place.

Ore and solid fuel, which may be coal (preferably sub-bituminous coal or lignite), charcoal, or any cellulosic material (wood waste, paper, municipal trash, garbage, etc.), is fed into the top of a shaft furnace in which three zones exist. In the uppermost zone, the gasification and initial reduction zone, the fuel is gasified by the controlled introduction of oxygen (about 98% pure, i.e., substantially free of nitrogen and other inert gases), and steam. Regenerated top gas is also introduced and burned. Conditions are controlled to produce gases which are predominently CO and $H_2$, diluted with $CO_2$ and steam, while preheating and initiating reduction of the iron ore.

The ore, fuel and gases descend co-currently into a second zone, the final reduction zone. Final reduction of the ore takes place in this zone. Hot hydrogen-enriched reducing gases are introduced in the middle of the second zone.

Off gases are removed from the upper portion as well as from the bottom of the second zone, cooled, purified of dust and carbon dioxide and, if necessary, sulfur. About 30% of the purified gases (essentially $H_2O$, CO and $H_2$) is mixed with air and burned to produce hot steam and provide power to extract oxygen from air. The balance of the gases is divided into two portions. One portion is to be enriched with $H_2$ by the catalytic water shift reaction. It is this enriched $H_2$, CO, $CO_2$ together with very hot steam which is introduced into the above-mentioned middle of the second zone. The other portion of the clean top gas is dehumidified and introduced near the bottom of the furnace above and below the grate for the cooling and carburizing to be described later.

The descending sponge iron from the second zone enters a third cooling and carburizing zone where it descends counter current to the rising recirculated and dehumidified gases described in the previous paragraph. These gases serve to cool and carburize the sponge iron descending from the second zone, becoming heated in the process. They ascend to the bottom of the second zone and are sucked off to be regenerated.

Sponge iron is discharged from the third zone by a moving grid, which delivers material alternately from spaced portions. This produces circulation and mixing in the final reduction zone and cooling and carburizing zone.

An amount of fuel considerably in excess of stoichiometric is employed so that carbon is dicharged together with the sponge iron. The excess carbon in the iron mixture encourages the carburization of the iron and insures that strongly reducing conditions are present throughout the furnace.

DETAILED DESCRIPTION

Figure 1:
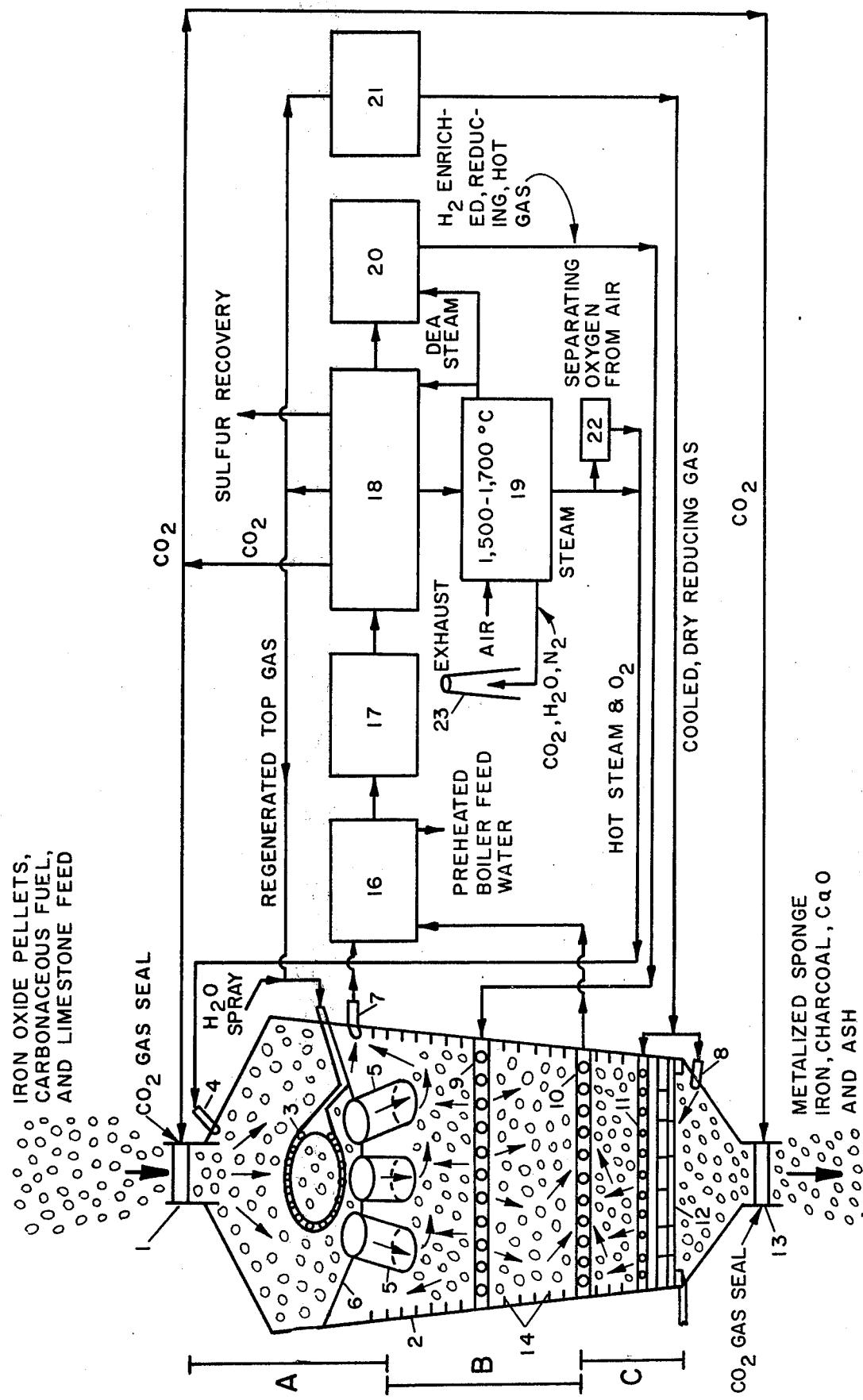
FIG. 1 is a diagrammatic illustration of the flow system of my invention.

Referring to the drawings, the process is carried out in a well insulated fixed, vertical shaft furnace 2 provided with gas seals 1 and 13 at the top and bottom, respectively. Within the furnace is a partition 6 containing discharge conduits 5. Near the bottom is a discharge grate 12, which will be described in detail later. A gas burner 3 is located above partition 6. A number of annular ribs 14 about the inner periphery prevent leakage of ascending or descending gas past the ore.

Other inlets and outlets will be described later.

A mixture of granulated or pelleted iron ore and solid carbonaceous fuel is introduced through seal 1, which is supplied with carbon dioxide extracted from top gas.

In operation, the interior of shaft furnace 2 may be considered divided into three zones, the gasification and initial reduction zone A above the partition 6, the final reduction zone B in the portion of the space between partition 6 and top gas exhaust system 10, and the cooling and carburizing zone C in the lower portion of the furnace. The process as it proceeds in these zones will now be described.

A. The gasification and initial reduction zone

A hot mixture of steam and oxygen is introduced at 4. The oxygen should have a purity of at least 98%, i.e., be substantially free of nitrogen and other inert gases. In at least the initial stages of operation, combustible gas, primarily carbon monoxide and hydrogen, are also fed to burners 3. Conditions are controlled to produce a temperature in the approximate range 750° C. to 950° C. Burning of the gas in burners 3 and the thermally insulated wall of the shaft help to maintain the temperature. The temperature is controlled by regulating the ratio and total amount of the steam and oxygen supplied at 4 and the combustible gas supplied to the burners 3. A water spray may be introduced into burners 3 if the temperature should become excessive. The solid fuel is subjected to partial oxidation, pyrolysis, and reaction with steam, producing a gas containing high proportions of carbon monoxide and hydrogen. Pressure at 4 is maintained at about 2½ atmospheres, absolute, and pressure at burners 3 is at about 2 atmospheres, absolute. The gas seal 1 and the resistance to gas flow of the material in conduits 5 make this possible.

The gas, partially reduced ore, and residual pyrolytic fuel (principally in the form of carbon) flow downwardly into zone B, i.e., the final reduction zone.

B. The final reduction zone

Additional hot steam and hydrogen-enriched CO—$CO_2$ mixture is distributed by manifold 9 to openings distributed about the periphery of furnace 2 at a pressure of about 2 atmospheres, absolute. This is the approximate midportion of zone B. Top gases are withdrawn both at 7 and 10 at a pressure of about 1 atmosphere, absolute. In this zone more of the fuel is gasified and reduction of the iron ore by the gas continues toward completion. Temperatures of 750° C. to 950° C. are preferably maintained in this zone. The higher the temperature, the more rapid will be the reduction, but it should not exceed a point well below the melting point of the ash or other solids. This lower temperature will prevent the formation of slag adhering to the inside wall of the shaft.

The reactions occurring in zones A and B will now be discussed.

In zone B the fuel will be largely in the form of carbon and the reactions between the carbon, hot steam, carbon dioxide and oxygen may be represented as follows:

$$C + O_2 \rightarrow CO^2 \qquad (1)$$

$$CO_2 + C \rightarrow 2CO \qquad (2)$$

$$C + H_2O \rightarrow CO + H_2 \qquad (3)$$

In zone A the situation is more complicated and depends on the composition of the fuel. If it is coke or charcoal the reactions will be the same as given above for zone B. As the hydrogen content of the fuel is increased, however, other and more complicated reactions come into play, particularly in the case of cellulose, which makes up the major portion of wood waste, municipal trash, garbage, etc.

Pyrolysis of cellulose with the production of carbon and volatiles also takes place. The volatiles react promptly with oxygen and steam, while the carbon moves down into zone B.

As stated above, an amount of solid fuel considerably in excess of stoichiometric is employed and a considerable amount of carbon is produced by pyrolysis and is discharged with the reduced iron.

The gases produced may have approximately the following composition.

| | | |
|---|---|---|
| (Reducing gas) | $H_2$ -- 29% | ⎫ |
| (Reducing gas) | $CO$ -- 64% | ⎭ |
| | $N_2$ -- <1% | |
| | $N_2O$ -- <2% | |
| | $CO_2$ -- 4% | |
| | $CH_4$ -- <0.5% | |

It is, however, variable and can be controlled. It is a function of the kind of carbonaceous material, the reaction temperature in the furnace, etc. However, the proportion of actual reducing gas, i.e., $H_2$ plus CO, should be more than 90%.

The reaction between the iron ore and the reducing gas is enhanced by the intimate contact between the iron ore and the solid materials from which the reducing gas is generated, the superatmospheric pressure of the gas and the continually shifting mass. The shifting is enhanced by the method of discharge, which will be described later.

The reduction of the ore involves the following reactions.

$$Fe_2O_3 + 3H_2 \rightarrow 2Fe + 3H_2O \quad (4)$$

$$Fe_2O_3 + 3CO \rightarrow 2Fe + 3CO_2 \quad (5)$$

$$FeO + H_2 \rightarrow Fe + H_2O \quad (6)$$

$$FeO + CO \rightarrow Fe + CO_2 \quad (7)$$

C. The cooling and carburizing zone

In the region below exhaust system 10 the reduced iron is cooled by contact with a dehumidified reducing gas in order to prevent reoxidation upon contact with the air and $H_2O$. Dried and cool reducing gas, consisting essentially of carbon monoxide and hydrogen, is introduced under a pressure of about 3 atmospheres, absolute, above and below discharge grate 12 at 11 and 8, respectively, and flows upwardly through the descending sponge iron. Then the cooling gas is withdrawn at 10 together with the top gas from zone B. In the upper, hotter portion of zone C, a carburizing reaction takes place between the iron and the reducing gas in accordance with the following reaction.

$$3Fe + CO + H_2 \rightarrow Fe_3C + H_2O \quad (8)$$

A certain amount of the iron carbide is desirable in the steel making process. The iron carbide will serve to reduce iron oxide remaining in the iron. One kg of carbon as iron carbide will produce about 6 kg iron from FeO.

In the direct reduction process, the ratio of metallic iron to total iron content in the finished product is termed the degree of metallization, which is commonly expressed as a percentage. Because of the capacity of the iron carbide to reduce residual iron oxide in an electric furnace, the sum of the percent metallization plus six times the percent carbon is termed the "equivalent metallization". Carburation during the cooling step permits a lower degree of metallization, and therefore a higher over-all production output, in the reducing zones, while still maintaining the desired equivalent metallization of about 98%.

The discharge through the grate 12 is carried out in a particular manner, which will now be described.

Figure 4:
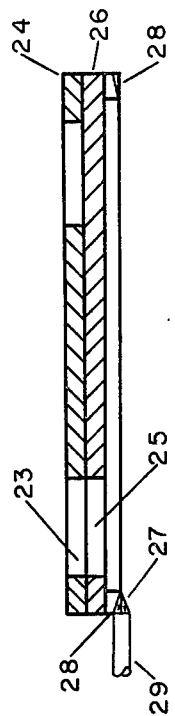
FIG. 4 is a vertical section through the discharge grate, showing discharge from one portion of the grate.
Figure 5:
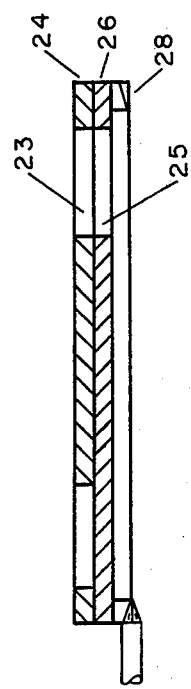
FIG. 5 is a section like FIG. 4, but showing discharge from another portion of the grate.
Figure 2:
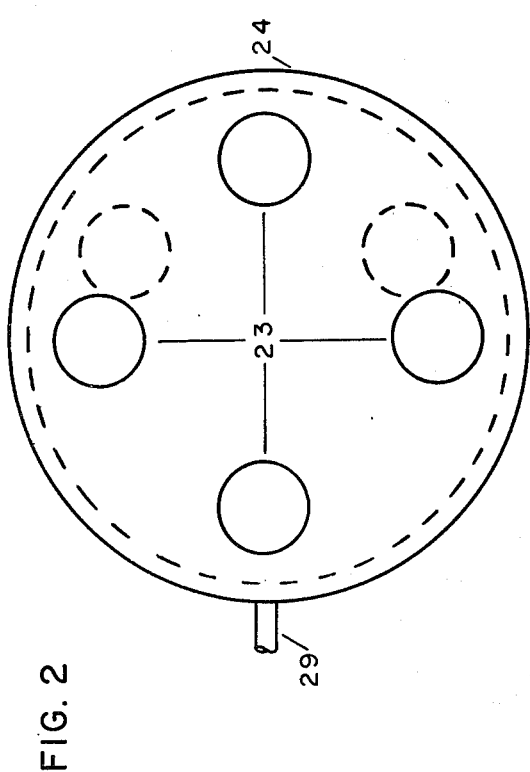
FIG. 2 is a top plan view of the discharge grate 12, FIG. 1.
Figure 3:
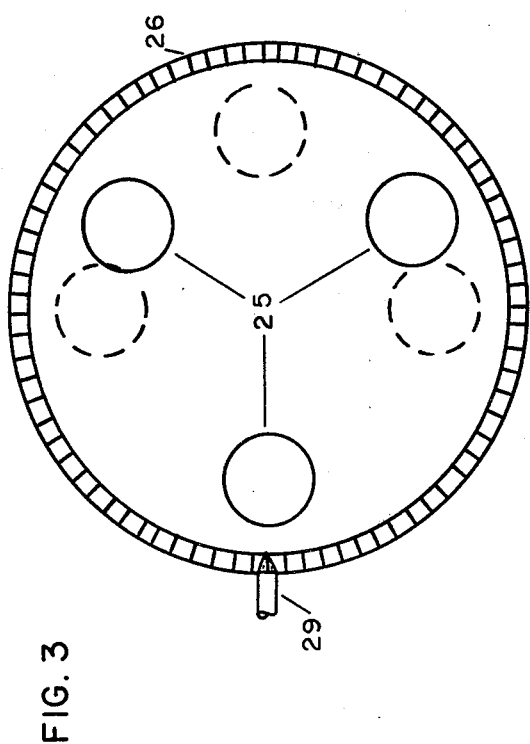
FIG. 3 is a bottom plan view of the discharge grate.

The grate 12 is formed of two elements, as shown in FIGS. 2, 3, 4 and 5.

It includes an upper fixed grate member 24 and a lower rotatable grate member 26. The lower grate section 26 carries a circular rack 28 which meshes with a pinion 27 driven by shaft 29. The upper grate member 24 contains a series of openings 23 and the lower grate member 26 contains a series of openings 25 which are spaced differently than openings 23. For simplicity, I have shown only four openings 23 and three openings 25. Thus only one opening 25 will be in registry with an opening 23 at any given time. By rotating or oscillating plate 26 about its axis by turning pinion 27, different openings will be in registry at different times. Thus, in FIG. 4, an opening 25 is in registry with one opening 23, while in FIG. 5 an opening 25 is in registry with the diametrically opposite opening 23. The successive discharge from different portions causes a shifting and mixing of material in final reducing zone B and cooling and carburizing zone C.

The discharged material consists of carburized sponge iron, ash and carbon. The two latter components are separated from the sponge iron, e.g., by screening and/or magnetic separation.

If the ash and carbon are sufficiently different in physical properties, the carbon is desirably separated and recycled to inlet 1. If separation is not feasible but the quantity of ash is small, a portion of the ash and carbon may be discharged and the remainder recycled. It is undesirable, however, to recycle a large quantity of ash.

Limestone or dolomite may be added with the fuel if it contains appreciable quantities of sulfur. While the raw limestone or dolomite may be used, I prefer that it be previously calcined and the resulting lime or calcined dolomite added to the charge. This avoids the generation of additional carbon dioxide within the furnace. The presence of carbon dioxide tends to suppress the reduction of the iron ore by carbon monoxide. The sulfided lime is separated from the iron ore by screening, gravity and/or magnetic separation, and discarded.

THE GAS CIRCUIT

As has been mentioned above, hot steam and oxygen are introduced at 4 into the gasification and initial reduction zone A at a pressure of 2½ atmospheres, absolute, and combustible gas is introduced in burner 3 under a lower pressure of 2 atmospheres, absolute. Hot steam and hydrogen-enriched CO—$CO_2$ gas at 2 atmospheres, absolute, are introduced at 9. A cooling gas of dried $H_2$ and CO is introduced at 8 and 11 at about 3 atmospheres, absolute. The lowest pressures in the shaft furnace are at 7 and 10, where top gas is withdrawn at a pressure of about 1 atmosphere, absolute. This pressure gradient causes a flow of the reducing gas produced in zone A together with the burning gas from burner 3 downwardly, cocurrent with the iron ore and carbon, through conduits 5. It also produces a flow of the hot steam and hydrogen-enriched CO and $CO_2$ upwardly and downwardly through zone B, and flow of the dehumidified reducing gases from 8 and 11 upwardly through zone C. This gas has become heated and is withdrawn at 10.

The gas withdrawn at 7 and 10 is then subjected to various treatments and recycled. This will now be described.

First the gas is passed in indirect heat exchange with water in waste heat boilers or heaters 16. (Because of the differences in temperature and pressure, it is preferable to use separate units for the gas from 7 and that from 10.) The hot water produced is used as feed to the high temperature boiler to be subsequently described.

The gas from heaters 16, which is still warm, is scrubbed with water in washer 17 to remove dust. It is then delivered to acid scrubbing tower 18, where acidic gases ($CO_2$, COS and $H_2S$) are removed. Lime solution, alkali, or alkali carbonates may be used for this purpose, but I prefer to use Benfield and diethanol amine (DEA) since the solutions can be regenerated by boiling with steam and recycled, liberating $CO_2$. The steam is from the high temperature burner and boiler 19. Sulfur can be recovered from the gases as elemental sulfur by Claus technology. The $CO_2$ is compressed and supplied to gas seals 1 and 13.

The cleaned gas from 18 is then divided. A portion is dehumidified at 21 and returned to cooling gas inlets 8 and 11. Another portion is supplied as feed to burners 3. Still another portion is supplied with air to high temperature boiler 19 where it is burned at a temperature of 1500°–1700° C. to remove odor before exhaust to air through stack 23 and to generate superheated steam. A portion of the steam may be used to furnish power to oxygen separation plant 22 which liquifies air and distills it to separate oxygen from nitrogen and other inert gases. This oxygen, together with more of the steam produced at 19, is fed to inlet 4 of shaft furnace 2. The last portion of the reducing gas, after acid washer 18, is enriched with hydrogen, which is stronger in reducing power than CO. This hydrogen enrichment is accomplished in reactor 20 by the water shift conversion:

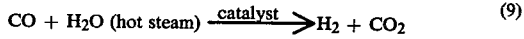

$$CO + H_2O \text{ (hot steam)} \xrightarrow{\text{catalyst}} H_2 + CO_2 \qquad (9)$$

This mixture of hot steam and hydrogen-enriched gas, containing CO and $CO_2$, is introduced at the middle (9) of final reduction zone B.

ENVIRONMENTAL ASPECTS

The only gases released to the atmosphere are the combustion gases released to stack 23 and the carbon dioxide from seals 1 and 13. Since the top gas has been purified before it is burned, these combustion gases will be almost entirely carbon dioxide, water vapor, nitrogen and excess oxygen from the combustion air. The high combustion temperature of 1500°–1700° C. will burn off the objectionable odor, if any. Dust is removed from the gas by washer 17. The water can be clarified and recycled. There should, therefore, be very little pollution of air or bodies of water.

Municipal trash and garbage create a problem for the nation from an environmental standpoint. By this invention, not only is the problem reduced, but this waste material is put to good use in reducing iron ore, thereby conserving natural gas for other uses. The capability of using municipal trash and garbage as fuel, because of the design of the furnace, is an important feature of my invention.

SPECIFIC EXAMPLE

A typical furnace is about 10.0 m in height and has a diameter of about 7.6 m at its midpoint. It is slightly tapered to compensate for the reduction in volume as the solid fuel is gasified.

It will be noted that gasification and initial reduction zone A is a substantially closed chamber, separated from the remainder of shaft furnace 2 by partition 6. It is in this chamber that the major gasification reaction takes place. Because it is an essentially confined zone, and isolated from the remainder of the shaft furnace, the supply of hot steam and $O_2$ (98% pure) will, together with the burning of the regenerated top gas, as well as water spray, control the temperature in the zone A and, in turn, the extent of pyrolysis of the solid carbonaceous fuel. Owing to this feature, it can accommodate almost any type of solid carbonaceous fuel. A particularly advantageous characteristic is the ability to utilize cellulosic material, such as wood waste, municipal trash and garbage, as described above.

In theory, one ton of cellulosic material should be sufficient to reduce three to four tons of iron ore. However, as noted above, it is desirable to employ an amount considerably in excess of stoichiometric. This insures that strongly reducing conditions are present at all times and that sufficient heat is produced to carry out the gasification and reduction reactions.

Accordingly, in a preferred embodiment, equal tonnages of municipal trash or garbage or chipped wood and ore granules are continuously charged to furnace 2 through gas seal 1. In zone A, a large proportion of the carbonaceous fuel is gasified and the remainder is converted to carbon. The iron ore and carbon descend through conduits 5 into final reducing zone B. In this zone, the iron ore may constitute 70% of the mass. The bulk density of the ore-carbon mixture in the final reducing zone B may be taken as about 2600 kg/$m^3$, of which about 1800 kg will be ore. Assuming a diameter of 7.6 m, a zone height of 3 m, and a residence time of 3 hours in the zone, the throughput could be about 2800 tonnes/day of ore, or about 2000 tonnes/day of metal.

I claim as my invention:

1. A method for the direct reduction of iron ore comprising
   (a) introducing said iron ore together with solid carbonaceous material, steam, burner gas and hot oxygen, substantially free of inert gases, into a gasification and initial reduction zone in the upper portion of a fixed vertical shaft furnace, controlling the admission of oxygen, steam and burner gas so as to maintain a temperature such as to cause partial combustion and pyrolysis of said carbonaceous material and reaction thereof with said steam to produce a reducing gas comprising carbon monoxide and hydrogen and initiate the reaction between said reducing gas and said ore,
   (b) flowing said iron ore, carbonaceous material and reducing gas downwardly through restricted passages into a final reduction zone,
   (c) introducing a hot mixture of steam and hydrogen-enriched carbon monoxide into a middle portion of said final reduction zone, (d) flowing said iron ore and said carbonaceous material downwardly through said final reduction zone while maintaining a temperature in said final reduction zone below the melting point of metallic iron, ash and other solid constituents, but sufficiently high to cause reduction of said iron ore to sponge iron, (e) flowing said sponge iron downwardly into a cooling zone, (f) introducing a cool, dehumidified reducing gas comprising carbon monoxide and hydrogen into a lower portion of said cooling zone, (g) drawing top gas from an upper and a lower portion of said final reduction zone at rates such as to cause reducing gas to flow downwardly from said gasification and initial reduction zone, upwardly and downwardly from said middle portion of said final reduction zone, and upwardly through said cooling zone, (h) withdrawing cooled sponge iron downwardly from said cooling zone.

2. A method as defined in claim 1 wherein said cooled sponge iron is withdrawn successively from laterally spaced positions to cause agitation and circulation in said cooling zone and said final reduction zone.

3. A method as defined in claim 1 comprising cooling and treating said top gas to remove dust, sulfur, carbon dioxide and water and utilizing said treated gas as the reducing gas introduced into said cooling zone.

4. A method as defined in claim 1 comprising treating said top gas to remove sulfur, carbon dioxide and water and burning a portion of said top gas to generate steam and separate oxygen from air.

5. A method as defined in claim 1 and further comprising purifying said top gas by removing dust, $CO_2$ and sulfur and recycling a portion of said purified top gas to said gasification and initial reducing zone to be burned.

6. A method as defined in claim 5 and further comprising catalytically reacting the carbon monoxide in said purified top gas with hot steam to enrich said purified top gas in hydrogen and recycling said enriched gas to said middle portion of said final reduction zone.

7. A method as defined in claim 1 wherein a temperature of 750° to 950° C. is maintained in both said gasification and initial reduction zone and said final reduction zone.

8. A method as defined in claim 1 wherein said gasification and initial reduction zone is a substantially closed chamber nearly partitioned from the remainder of said shaft furnace.

9. A method as defined in claim 1 wherein said carbonaceous material is a cellulosic material.

10. A method as defined in claim 1 wherein said solid carbonaceous material is selected from the group consisting of garbage, municipal trash wood waste and low-grade coal.

* * * * *